US011825446B2

(12) United States Patent
Zhou et al.

(10) Patent No.: US 11,825,446 B2
(45) Date of Patent: Nov. 21, 2023

(54) UE AIDED FAST CARRIER SELECTION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Seyed Ali Akbar Fakoorian, San Diego, CA (US); Mostafa Khoshnevisan, San Diego, CA (US); Kazuki Takeda, Yokosuka (JP); Konstantinos Dimou, San Francisco, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/915,450

(22) Filed: Jun. 29, 2020

(65) Prior Publication Data

US 2021/0007080 A1 Jan. 7, 2021

Related U.S. Application Data

(60) Provisional application No. 62/871,121, filed on Jul. 6, 2019.

(51) Int. Cl.
*H04W 72/02* (2009.01)
*H04W 72/0453* (2023.01)
(Continued)

(52) U.S. Cl.
CPC .......... *H04W 72/02* (2013.01); *H04B 17/318* (2015.01); *H04B 17/336* (2015.01);
(Continued)

(58) Field of Classification Search
CPC .... H04W 72/02; H04B 17/318; H04B 17/336
See application file for complete search history.

(56) References Cited

U.S. PATENT DOCUMENTS

2010/0296389 A1* 11/2010 Khandekar ........... H04L 5/0037
370/242
2011/0310986 A1* 12/2011 Heo ..................... H04L 5/0055
375/259
(Continued)

FOREIGN PATENT DOCUMENTS

SE  WO-201088930 A2 *  8/2010 ............ H04W 36/30
SE  WO-2010088930    *  8/2010 ............ H04W 36/30
(Continued)

OTHER PUBLICATIONS

International Search Report and Written Opinion—PCT/US2020/040284—ISAEPO—dated Oct. 6, 2020.
(Continued)

*Primary Examiner* — Jamal Javaid
*Assistant Examiner* — Ryan C Kavleski
(74) *Attorney, Agent, or Firm* — Norton Rose Fullbright US LLP

(57) ABSTRACT

In one aspect, a method of wireless communication includes monitoring, by a user equipment (UE), a first component carrier (CC) of a plurality of CCs for a first channel, determining, by the UE during monitoring, one or more channel measurements for a set of candidate CCs of the plurality of CCs, determining, by the UE based on a determination at the UE, whether to include carrier selection data in an uplink transmission, the carrier selection data based on one or more channel measurements, and transmitting, by the UE, the carrier selection data in the uplink transmission. Other aspects and features are also claimed and described.

30 Claims, 10 Drawing Sheets

(51) Int. Cl.
*H04W 24/08* (2009.01)
*H04W 24/10* (2009.01)
*H04W 76/28* (2018.01)
*H04B 17/336* (2015.01)
*H04B 17/318* (2015.01)
*H04L 5/00* (2006.01)

(52) U.S. Cl.
CPC ........... *H04L 5/0055* (2013.01); *H04W 24/08* (2013.01); *H04W 24/10* (2013.01); *H04W 72/0453* (2013.01); *H04W 76/28* (2018.02); *H04L 5/001* (2013.01)

(56) References Cited

U.S. PATENT DOCUMENTS

| | | | |
|---|---|---|---|
| 2013/0194981 A1* | 8/2013 | Wang | H04L 1/1861 370/280 |
| 2018/0048433 A1* | 2/2018 | Martin | H04L 1/1893 |
| 2018/0124784 A1* | 5/2018 | Kumar | H04W 52/0206 |
| 2019/0098601 A1* | 3/2019 | Kumar | H04W 72/563 |
| 2020/0396760 A1* | 12/2020 | Yi | H04L 1/1864 |

FOREIGN PATENT DOCUMENTS

| | | | | |
|---|---|---|---|---|
| SE | WO-2010088930 A2 * | 8/2010 | | H04W 36/30 |
| WO | WO-2010088930 A2 | 8/2010 | | |

OTHER PUBLICATIONS

Sony Corporation: "LAA Measurements and Carrier Selection Procedure", 3GPP Draft, 3GPP TSG RAN WG1 Meeting #84, R1-160673, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016 (Feb. 14, 2016), XP051054001, 4 Pages, Retrieved from the Internet: URL: http://www.3gpp.org/ftp/Meetings_3GPP_SYNC/RAN1/Docs/, [retrieved on Feb. 14, 2016], the whole document.

* cited by examiner

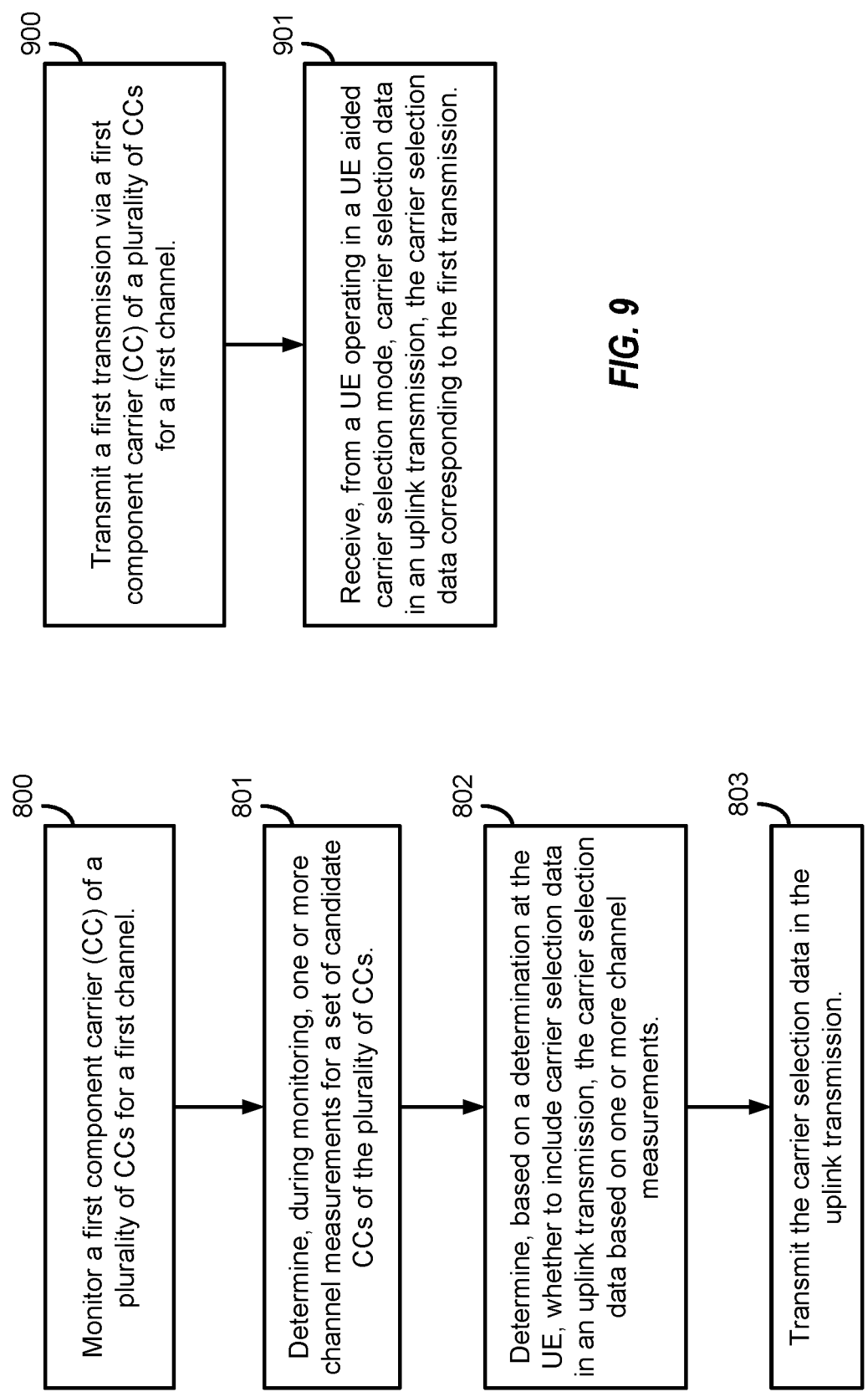

UE AIDED FAST CARRIER SELECTION

CROSS-REFERENCE TO RELATED APPLICATIONS

This application claims the benefit of a U.S. Provisional Patent Application No. 62/871,121, entitled, "UE Aided Fast Carrier Selection," filed on Jul. 6, 2019, which is expressly incorporated by reference herein in its entirety.

TECHNICAL FIELD

Aspects of the present disclosure relate generally to wireless communication systems, and more particularly, to UE aided carrier selection. Certain embodiments of the technology discussed below can enable and provide UE determination for inclusion and transmission of carrier selection data.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes monitoring, by a user equipment (UE), a first component carrier (CC) of a plurality of CCs for a first channel, determining, by the UE during monitoring, one or more channel measurements for a set of candidate CCs of the plurality of CCs, determining, by the UE based on a determination at the UE, whether to include carrier selection data in an uplink transmission, the carrier selection data based on one or more channel measurements, and transmitting, by the UE, the carrier selection data in the uplink transmission.

In an additional aspect of the disclosure, a method of wireless communication includes transmitting, by a base station, a first transmission via a first component carrier (CC) of a plurality of CCs for a first channel, and receiving, by the base station from a UE operating in a UE aided carrier selection mode, carrier selection data in an uplink transmission, the carrier selection data corresponding to the first transmission.

In an additional aspect of the disclosure, an apparatus configured for wireless communication is disclosed. The apparatus includes at least one processor, and a memory coupled to the processor. The processor is configured to monitor, by a user equipment (UE), a first component carrier (CC) of a plurality of CCs for a first channel, determine, by the UE during monitoring, one or more channel measurements for a set of candidate CCs of the plurality of CCs, determine, by the UE based on a determination at the UE, whether to include carrier selection data in an uplink transmission, the carrier selection data based on one or more channel measurements, and transmit, by the UE, the carrier selection data in the uplink transmission.

In an additional aspect of the disclosure, an apparatus configured for wireless communication is disclosed. The apparatus includes at least one processor, and a memory coupled to the processor. The processor is configured to transmit, by a base station, a first transmission via a first component carrier (CC) of a plurality of CCs for a first channel, and receive, by the base station from a UE operating in a UE aided carrier selection mode, carrier selection data in an uplink transmission, the carrier selection data corresponding to the first transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a block diagram illustrating example blocks executed by a UE configured according to an aspect of the present disclosure.

FIG. 9 is a block diagram illustrating example blocks executed by a base station configured according to an aspect of the present disclosure.

DETAILED DESCRIPTION

Figure 1:
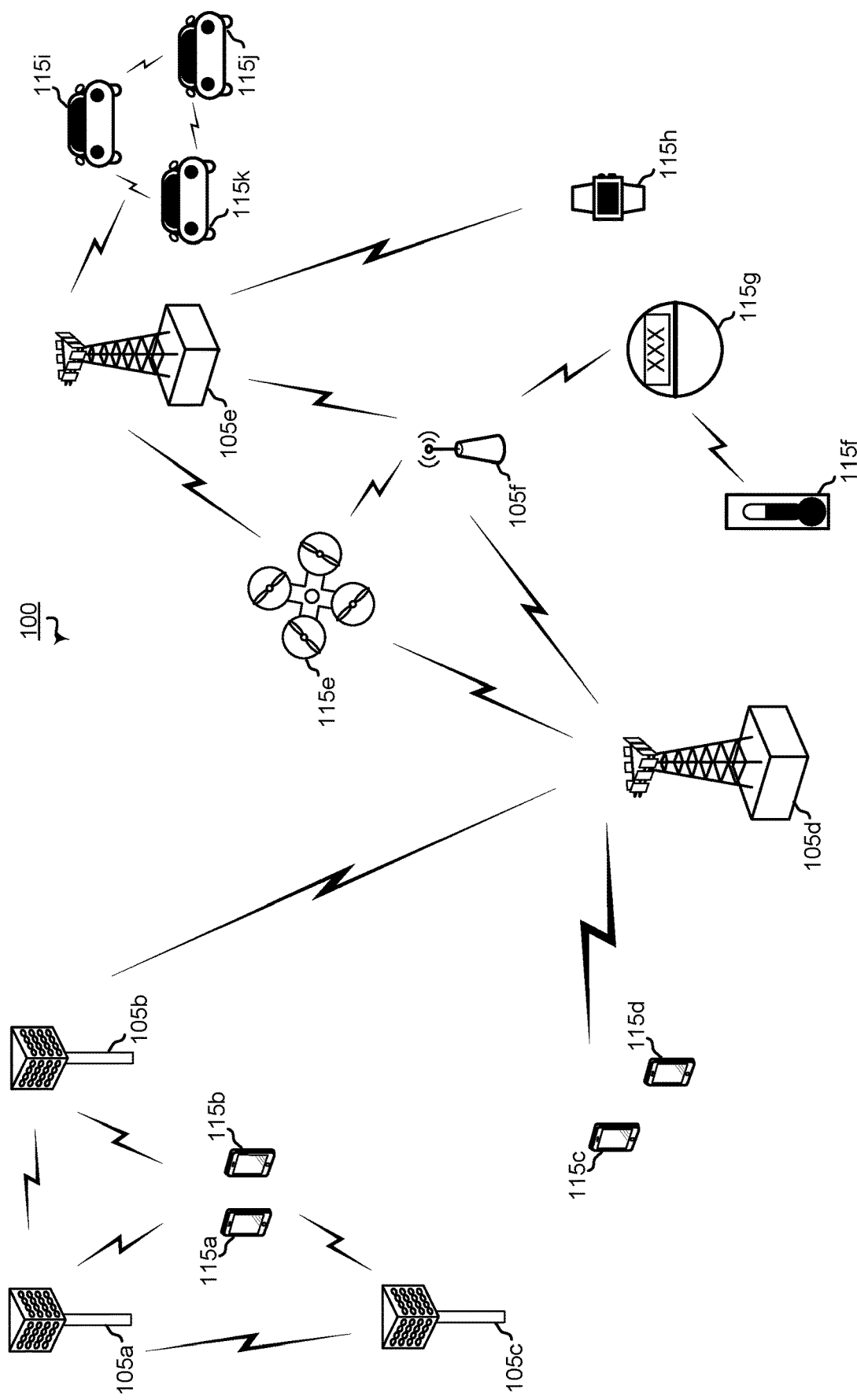
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
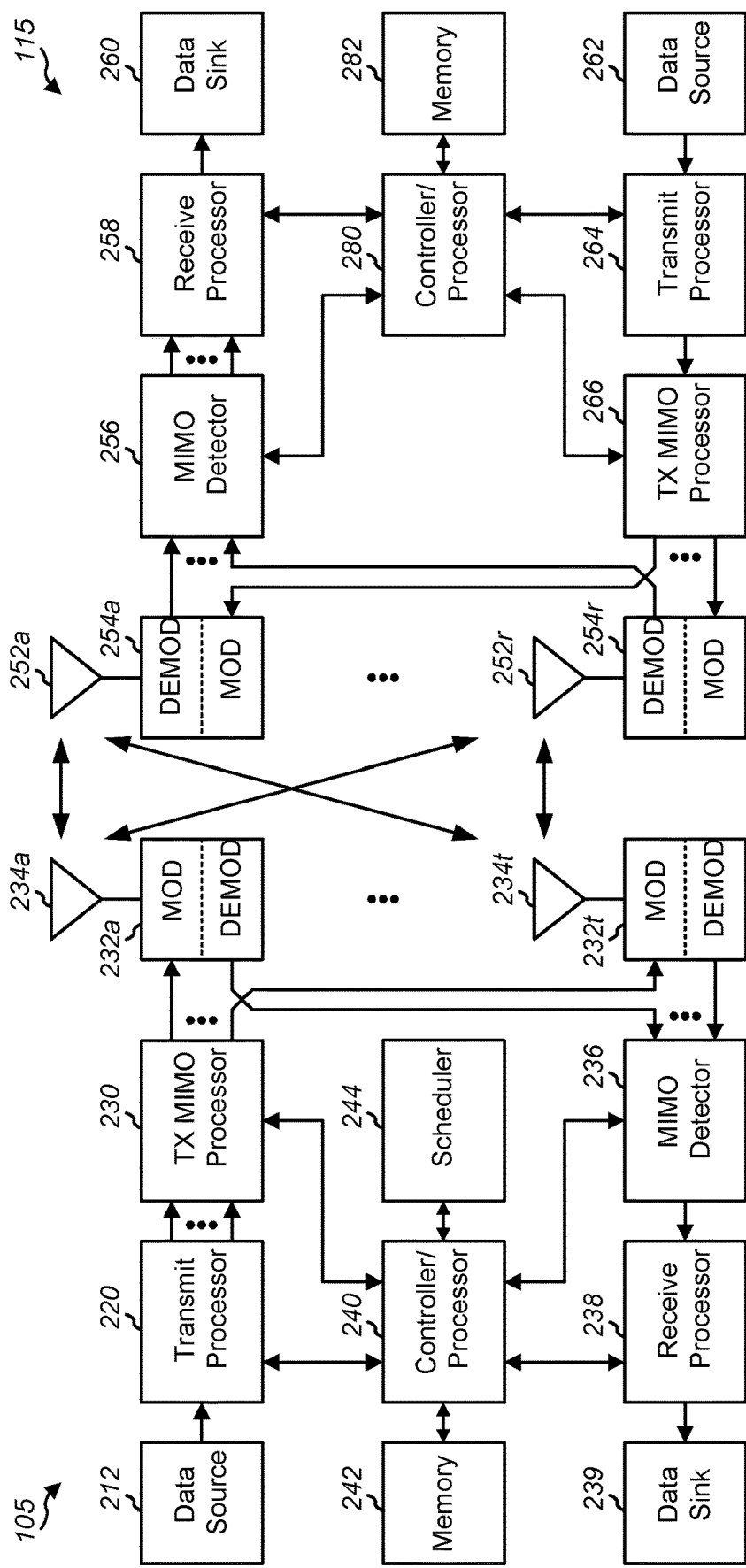
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
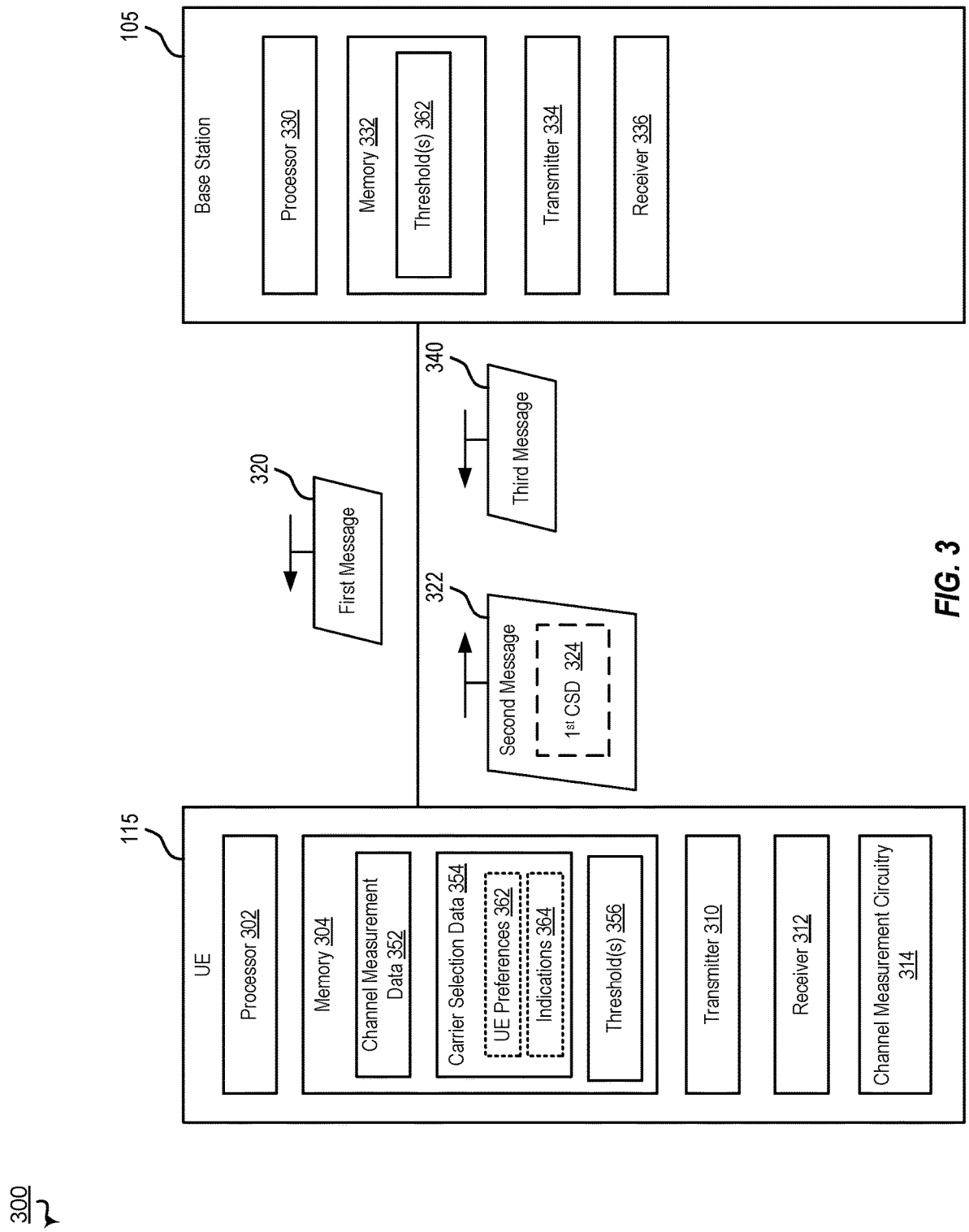
FIG. 3 is a block diagram illustrating an example of a wireless communications system that enables UE aided carrier selection in accordance with aspects of the present disclosure.

FIG. 3 illustrates an example of a wireless communications system 300 that supports UE added carrier selection (e.g., UE based fast carrier selection) in accordance with aspects of the present disclosure. In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both. UE aided (or assisted) fast carrier selection may enable carrier selection data to be transported in the same cycle in which it was generated and/or determined to be sent to a base station, such as base station 105.

UE 115 includes processor 302, memory 304, transmitter 310, receiver 312, and channel measurement circuitry 314. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store channel measurement data 352, carrier selection data 354, thresholds 356, or a combination thereof, as further described herein.

Carrier selection data 354 may include multiple types of information, such as channel measurement data 352 (e.g., soft information or actual measurement data indicating channel quality), UE preferences 362, or UE indications 364. Channel measurement data 352 may include measurements or estimates of one or more parameters for particular channel (e.g., CC) for one or more transmissions thereof. The channel measurement data 352 may be for a single transmission, a number of transmissions, or all transmissions of a particular duration for a particular channel. The channel measurement data 352 may include RSRP, SINR, path loss, interference and/or noise level, decoding log likelihood ratio, estimated BLER of monitored CORESETs, power headroom, estimated RSRP, or a combination thereof. The individual measurements may be averaged over a time window for a single channel or across multiple channels (e.g., CCs) and/or CORESETs per CC in a frequency range or frequency band.

The UE preference(s) 362 are configured to provide a preference to a base station for one or more upcoming transmissions, which the base station may use to determine transmission settings for the one or more upcoming transmissions. For example, the UE preference(s) 362 may influence a base station to use another CC for subsequent PDSCH transmission(s). The UE preferences 362 may include a preferred frequency range, a preferred frequency band, a preferred CC, a preferred CC type (e.g., UL or DL), or a combination thereof, for at least a next PDSCH transmission. As illustrative examples, the frequency range may include FR1 vs FR2, the frequency band in a particular FR, such as 28 GHz band vs 39 GHz band, the CC may include a CC of a particular frequency band, such as CC1, CC2, etc. The UE preference(s) 362 may be indicated by a CC index (e.g., CC index bit or bitmap). The UE preference(s) 362 may further specify a type for the particular preference, such as UL or DL.

In a particular implementation, the UE 115 further indicates a value or strength of the preference in the carrier selection data (e.g., high or low, 1-3, etc.). The UE preference(s) 362 are generated by the UE 115 based on channel measurements/channel measurement data 352, as described further herein. Thus, the UE 115 may provide preferences to the base station to help the base station select a particular frequency range or band, such as a particular CC, based on the channel measurements/channel measurement data 352.

The UE indication 364 is configured to provide an indication to a base station for one or more upcoming transmissions. For example, the UE indication 364 may direct a base station to use another CC for PDSCH transmission, to suspend PDSCH transmission on a current CC, to resume PDSCH transmission on a previous CC. The UE indication 364 is generated by the UE 115 based on channel measurements/channel measurement data 352, as described further herein. Thus, the UE 115 may instruct the base station 105 to use a particular frequency range or band, such as a particular CC, based on the channel measurements/channel measurement data 352.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Channel measurement circuitry 314 is configured to measure or estimate channel quality and generate channel measurements (e.g., channel measurement data 352). Although illustrated as separate from processor 302, transmitter 310, and receiver 312, channel measurement circuitry 314 may include or correspond to such components.

Base station 105 includes processor 330, memory 332, transmitter 334, and receiver 336. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store thresholds 362, such as one or more thresholds configured to determine transmission settings based on the carrier selection data 354 received from the UE 115. For example, when the carrier selection data 354 includes measurements or preferences (e.g., 352, 362), the base station 105 may make a determination to generate transmission settings based on comparing the carrier selection data 354 to one or more thresholds 362. As another example, when the carrier selection data 354 includes an indication (e.g., 364), the base station 105 may make a determination to generate transmission settings for one or more subsequent transmissions based on comparing the carrier selection data 354 from the UE to other carrier selection data from other UEs to avoid two UEs selecting the same CC and/or settings. Memory 332 may also be configured to store channel measurement data, carrier selection data, thresholds, or a combination thereof, associated with UE 115, as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2.

During operation of wireless communications system 300, a first message 320 is transmitted by the base station 105 via a first channel (e.g., first component carrier (CC)). Based on the first message 320, the UE 115 performs a channel measurement on the first channel and generates channel measurement data (e.g., first channel measurement data 324). In some implementation, the UE 115 compares the channel measurement data 352 (e.g., first channel measurement data 324) for the first channel to a threshold of thresholds 356. In other implementations, the UE 115 compares channel measurement data 352 including multiple channel measurements (such as from past messages) to one or more corresponding thresholds of thresholds 356 or channel measurement data 352 including an average channel measurement to a corresponding threshold of thresholds 356, as described further herein.

The UE 115 generates carrier selection data 354 based on the channel measurement data 352 (e.g., first channel measurement data 324). For example, the UE 115 generates carrier selection data 354 (e.g., first carrier selection data 324) based on a carrier selection data setting or based on a second comparison. To illustrate, the UE 115 may be configured or adjusted to generate a particular type of carrier selection data 354, such as channel quality data 352, UE preferences 362, UE indication 364, or a combination thereof, based on a setting. As another illustration, the UE 115 may compare the channel measurement data 352 to a second threshold or thresholds of thresholds 356 to determine type of carrier selection data 354.

Based on one or more of the above comparisons (e.g., first comparison, second comparison, or both), a determination of successfully decoding of a message (e.g., first message 320), or both, the UE 115 determines whether to include carrier selection data, such as first carrier selection data 324, in a second message 322 corresponding to the first message 320. To illustrate, UE 115 includes first carrier selection data 324 in the second message 324 based on unsuccessful decoding of first message 320. The second message 322 may be an acknowledgement message or control message for the first message 320, such as UCI or a media access control (MAC) control element (MAC-CE). The acknowledgement message may be sent in a PUCCH or a PUSCH. As an illustrative example, a MAC-CE can be sent in a PUSCH.

The base station 105 may transmit a third message 340 based on or using the first carrier selection data 324, as further described herein. For example, the base station 105 may compare the first carrier selection data 324 to other carrier selection data from other UEs and/or compare the first carrier selection data 324 to the one or more thresholds 362. The third message 340 may include or correspond to a retransmission and/or may be transmitted on another channel (e.g., another CC) that is different from a channel of the first message 320, the second message 322, or both.

Thus, FIG. 3 describes UE aided/assisted carrier selection for transmissions between UE 115 and base station 105. Providing updated carrier selection data to base station 105 based on a UE determination enables network to reduce latency and overhead and improve reliability, as compared to providing channel quality data in response to channel quality report requests signaled by the base station 104 or always including channel quality data. Additionally, particular types of carrier selection data 354 (e.g., UE preferences 362 or indications 364) may further reduce processing of the base station 105, because the base station 105 may utilize less processing to transmit or receive a next message or retransmit a precious message. Improving performance of such operations may improve SNR and throughput for communications on the network and enable use of mm wave frequency ranges and URLLC modes.

Figure 4:
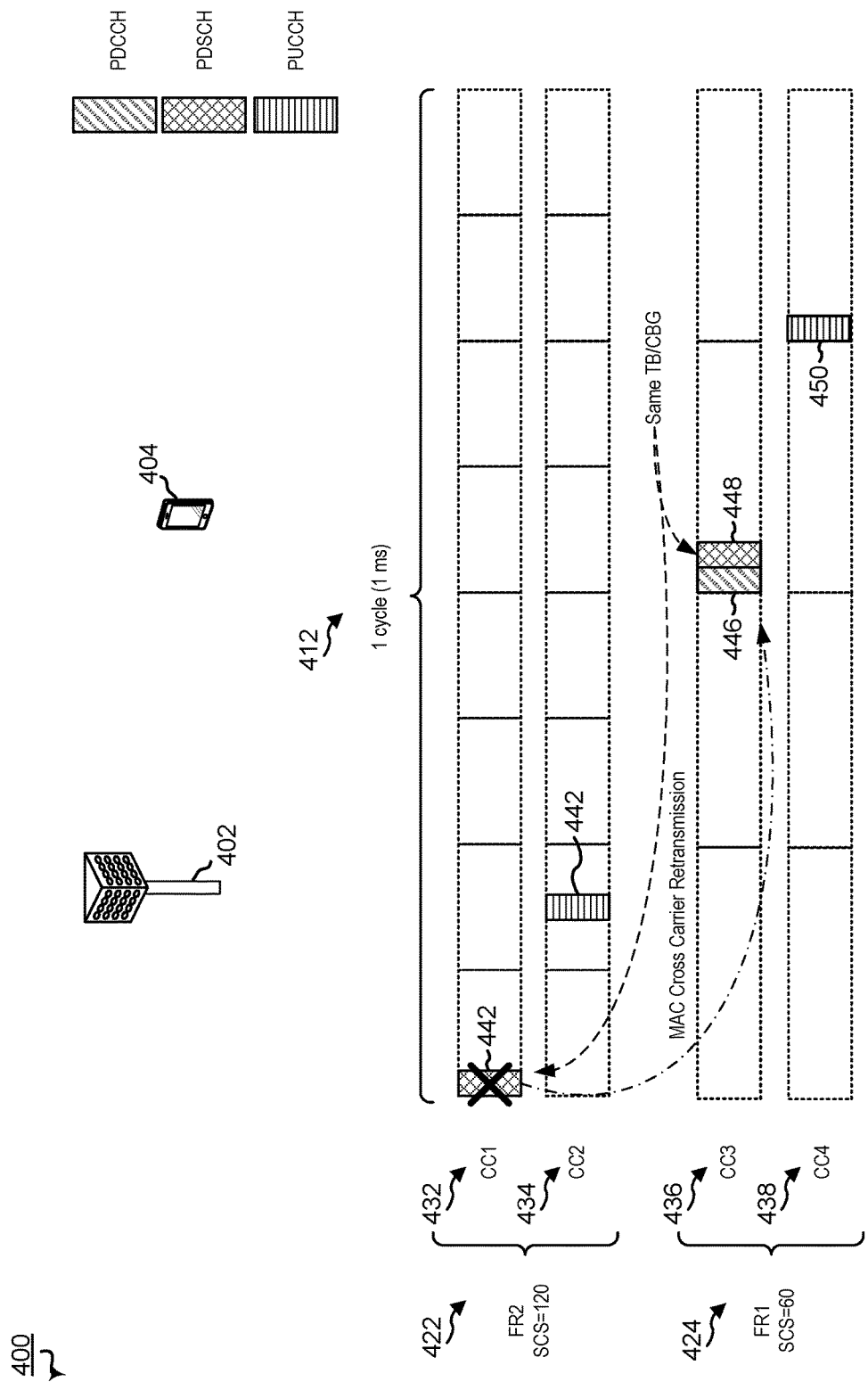
FIG. 4 is an example of a block diagram illustrating a portion of an NR network in which communications occur between a base station and UE each configured.
Figure 5:
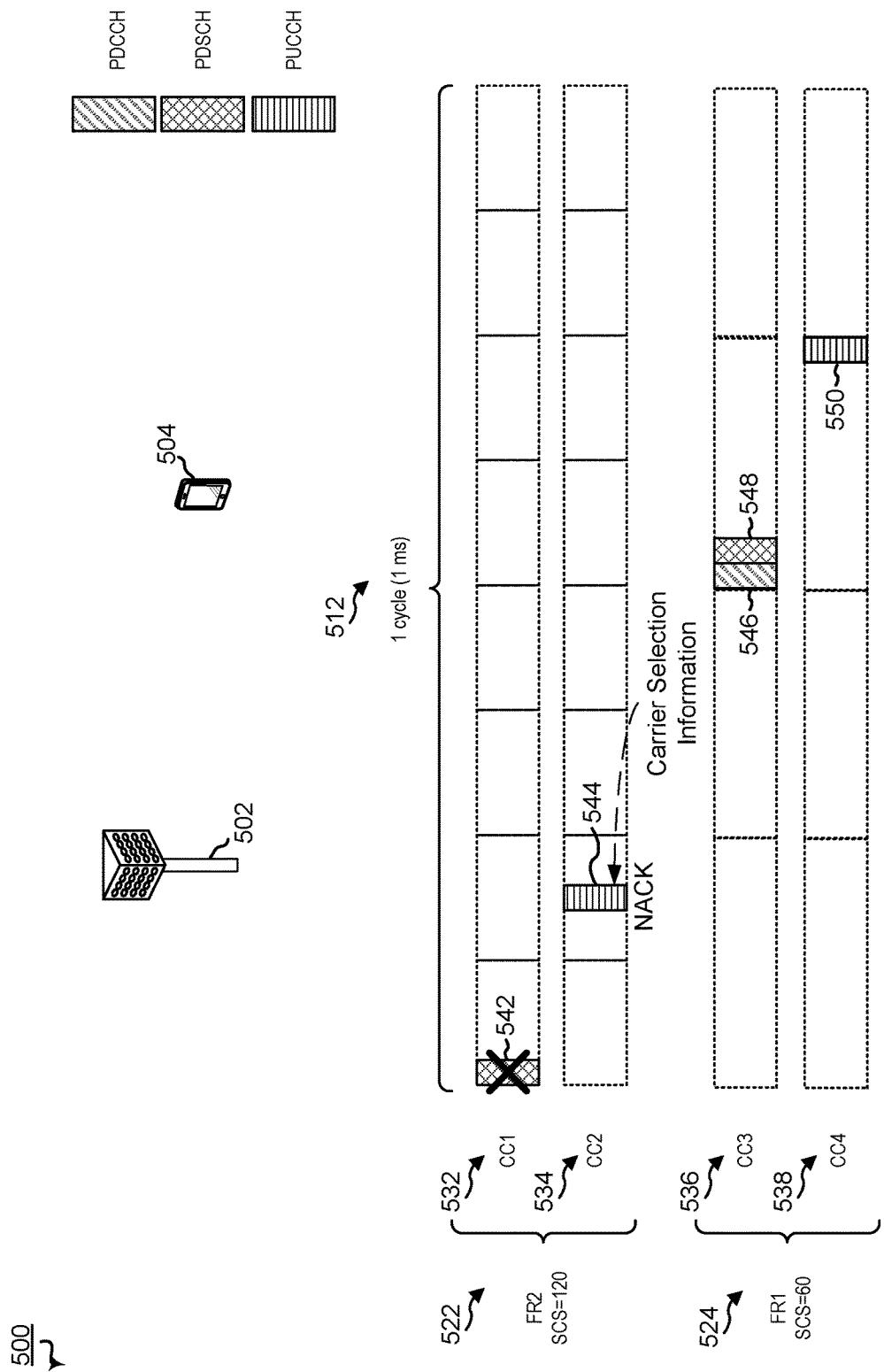
FIG. 5 is an example of a block diagram illustrating a portion of an NR network in which communications occur between a base station and UE each configured according to aspects of the present disclosure.
Figure 6:
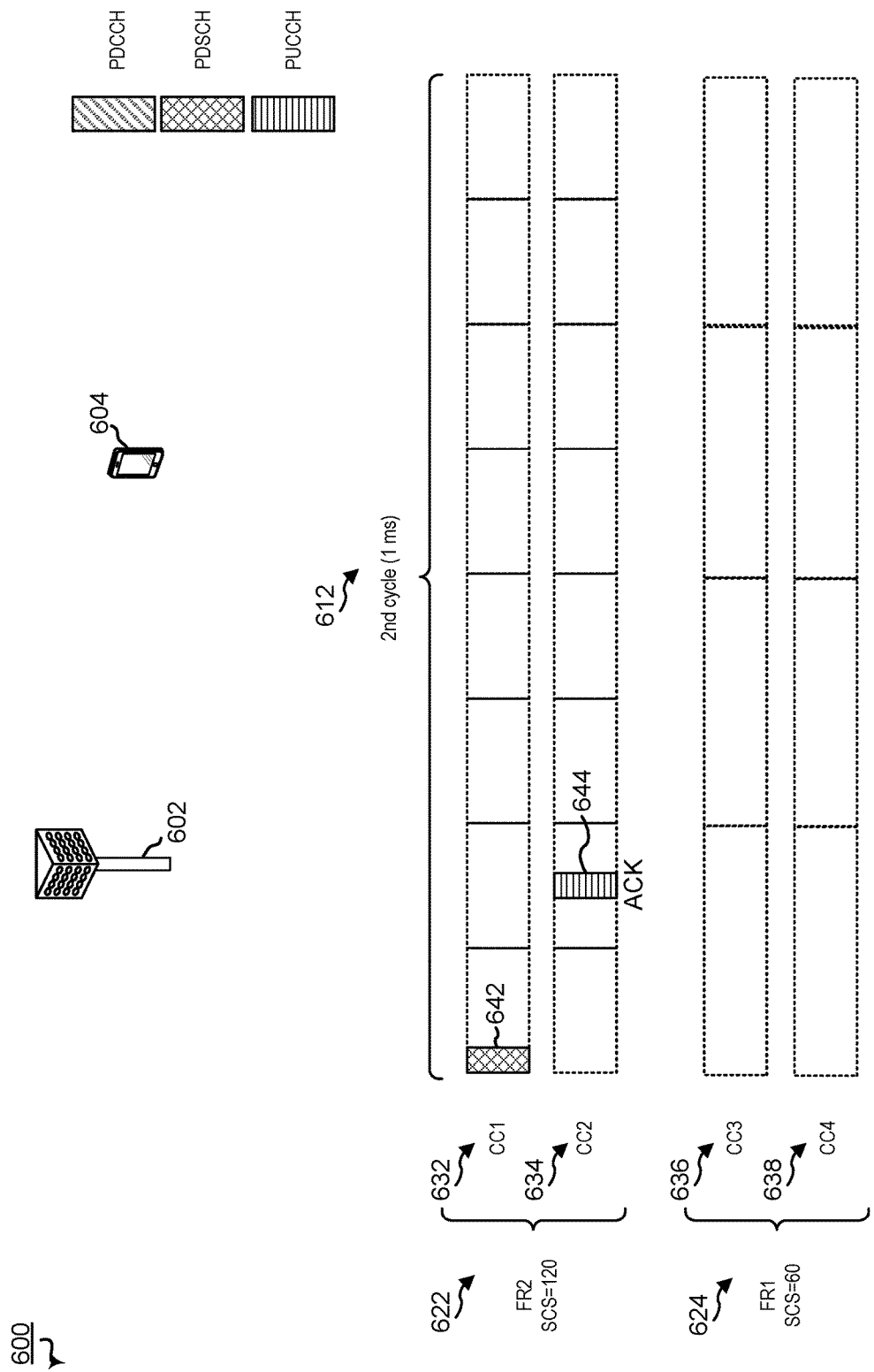
FIG. 6 is an example of a block diagram illustrating a portion of an NR network in which communications occur between a base station and UE each configured according to aspects of the present disclosure.
Figure 7:
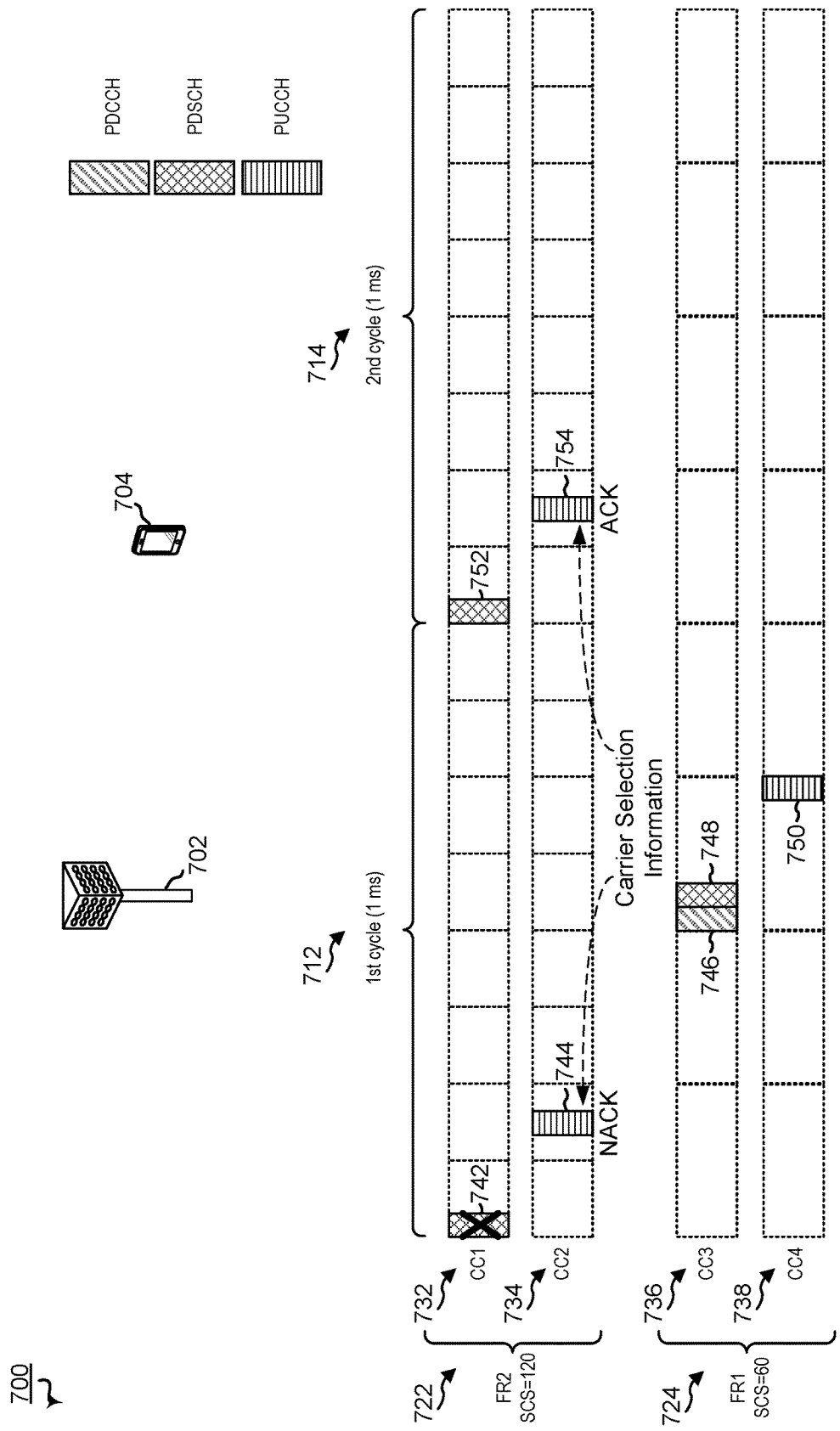
FIG. 7 is an example of a block diagram illustrating a portion of an NR network in which communications occur between a base station and UE each configured according to aspects of the present disclosure.

FIGS. 4-7 illustrate examples of carrier selection. FIG. 4 illustrates an example of base station initiated carrier selection. FIGS. 5-7 illustrate examples of UE aided carrier selection according to aspects of the disclosure. FIG. 5 illustrates a reactive mode, FIG. 6 illustrates a proactive mode, and FIG. 7 illustrates a hybrid mode.

Referring to FIG. 4, FIG. 4 illustrates a timing diagram 400 illustrating communications between a base station 402 and a UE 404. Base station 402 may direct the UE 404 to always provide channel quality information, such as provide channel quality information in every uplink message or all uplink messages of a certain type, such as in all UCI messages (which may be sent in a corresponding PUCCH). Base station 402 may signal to the UE 404 to always provide channel quality information by a configuration message, such as a radio resource control (RRC) configuration message or upon the UE 404 joining the network. However, always providing channel quality information increases overhead and may reduce reliability.

Alternatively, base station 402 may direct the UE 404 to provide channel quality information on demand, such as provide channel quality information response to a UE channel report request. Base station 402 may signal to the UE 404 to provide channel quality information responsive to a UE channel report request in a downlink message. However, on-demand channel quality information may not be reported in the same cycle in which a UE channel report request was sent. To illustrate, short cycle times (e.g., low latency modes), signal blockage, interference, slot configuration, etc. may affect a UE's ability to decode the UE channel report request, measure or estimate a channel, and provide the channel measurement in the same cycle. As an example, URLLC operates with low latency and responses to UE channel report requests are generally provided in the next cycle.

Referring to timing diagram 400, a first cycle 412 is illustrated for two frequency ranges (e.g., FR1 and FR2), a first frequency range 422 (e.g., FR2) and a second frequency range 424 (e.g., FR1). As illustrated in FIG. 4, a sub carrier spacing (SCS) of the frequency ranges 422 and 424 may be different, such as 60 and 120. Also, two component carriers (CCs) are illustrated for each frequency range 422, 424. Specifically, the first frequency range 422 has a first CC 432

(e.g., CC1) and a second CC 434 (e.g., CC2), and the second frequency range 424 has a third CC 436 (e.g., CC3) and a fourth CC 438 (e.g., CC4).

In FIG. 4, the base station 402 transmits a PDSCH 442 (e.g., first PDSCH) via the first CC 432. The PDSCH 442 may be signaled by the base station 402 by a corresponding PDCCH (not shown, such as PDCCH 446) via first CC 432. In the example of FIG. 4, the UE 404 is not able to successfully receive and/or decode the PDSCH 442. For example, there may be signal blockage on first CC 432, interference, etc. In response to UE report request or an always report mode, the UE 404 includes channel quality measurement information in a negative acknowledgment message (NACK) in PUCCH 444 (e.g., first PUCCH). The NACK may be included in an uplink control message, such as Uplink Control Information (UCI). The base station 105 then performs retransmission for PDSCH 442 in the second frequency range, as further described with reference to FIG. 5.

Referring to FIG. 5, FIG. 5 illustrates a timing diagram 500 illustrating communications between a base station 502 and a UE 504. Base station 502 may direct the UE 504 to operate in a UE aided carrier selection mode, such as provide channel quality information based on a determination performed at the UE. Thus, the UE decides when to send carrier selection data (e.g., channel quality information) and when to not send carrier selection data. Alternatively, the UE may enable operation in a UE aided carrier selection mode based on transmitting a configuration or capabilities message. In the example illustrated in FIG. 5, the UE operates in a reactive mode (e.g., a reactive UE aided carrier selection mode), that is, the UE determines to include/transmit carrier selection data based on not receiving a message, such as scheduled message.

Referring to timing diagram 500, a first cycle 512 is illustrated for two frequency ranges (e.g., FR1 and FR2), a first frequency range 522 (e.g., FR2) and a second frequency range 524 (e.g., FR1). Also, two component carriers (CCs) are illustrated for each frequency range 522, 524. Specifically, the first frequency range 522 has a first CC 532 (e.g., CC1) and a second CC 534 (e.g., CC2), and the second frequency range 524 has a third CC 536 (e.g., CC3) and a fourth CC 538 (e.g., CC4).

The base station 502 transmits a PDSCH 542 (e.g., first PDSCH) via the first CC 532. The PDSCH 542 may be signaled by the base station 502 by a corresponding PDCCH (not shown, such as PDCCH 546) via first CC 532. In the example of FIG. 5, the UE 504 is not able to successfully receive and/or decode the PDSCH 542. For example, there may be signal blockage on first CC 532, interference, etc. In response to a PDSCH, such as PDSCH 542, UE 504 may transmit an acknowledgment message. In the example of FIG. 5, in response to not decoding PDSCH 542, the UE 504 transmits a negative acknowledgment message (NACK) in PUCCH 544 (e.g., first PUCCH). The NACK may be included in an uplink control message, such as Uplink Control Information (UCI). Alternatively, the UE 504 uses discontinuous transmission (DTX) for PUCCH 544 (e.g., first PUCCH), such as undergoes a temporary power-off or muting during PUCCH 544 and sends no signal (e.g., message or data).

Additionally, UE 504 determines whether or not to send carrier selection data (e.g., 354) to the base station 502, i.e., whether or not to generate and/or include the carrier selection data in PUCCH 544, such as a UCI thereof. For example, the UE 504 determines to include carrier selection data in the PUCCH 544 based on not successfully decoding the PDSCH 542. In other examples, the UE 504 may determine to not include carrier selection data in the PUCCH 544 based on successfully decoding another PDSCH.

Responsive to receiving the NACK, the base station 502 determines to initiate retransmission of the PDSCH 542. Base station 502 determines to retransmit a PDSCH 548 (e.g., second PDSCH or PDSCH retransmission) based on the carrier selection data. For example, base station 502 determines to retransmit the PDSCH 548 via the third CC 536 in the second frequency range 524. The PDSCH 542 and the PDSCH 548 may have the same transport block (TB), the same code block group (CBG), or both.

The base station 502 signals the PDSCH 548 to the UE 504 by transmitting a PDCCH 546. IN FIG. 5, the PDCCH 546 is transmitted via the third CC 536. In the example in FIG. 5, the UE 504 successfully decodes the PDSCH 548 and transmits a second acknowledgment message in response via PUCCH 550 (e.g., second PUCCH). As illustrated in FIG. 5, in response to decoding PDSCH 548, the UE 504 sends a positive acknowledgment message (ACK) in PUCCH 550. The ACK may be included in an uplink control message, such as a UCI. In some implementations, the UE 504 may not (e.g., may cease) including carrier selection data in the PUCCH 550. To illustrate, the UE 504 ceases to include carrier selection data in subsequent PUCCHs after successful retransmission. In other implementations, the 504 may include carrier selection data in the PUCCH 550. For example, the UE 504 may continue to include carrier selection data in subsequent PUCCHs after successful retransmission for X amount of cycles. The amount of cycles may be preprogramed or reconfigurable. As illustrative, non-limiting examples, 2, 3, 4, 5, 6, 7, 10, etc., cycles may be used for X. Responsive to receiving the ACK, the base station 502 determines to not repeat retransmission of the PDSCH 542 (or not initiate retransmission of PDSCH 548).

Because the UE is not always providing channel quality information, overhead is reduced and thus latency may be decreased and reliability increased. Additionally, because the UE can determine to transmit carrier selection data independently of the base station, the carrier selection data may be received in the current cycle, which may reduce latency.

Referring to FIG. 6, FIG. 6 illustrates a timing diagram 600 illustrating communications between a base station 602 and a UE 604. Base station 602 may direct the UE 604 to operate in a UE aided carrier selection mode, such as provide channel quality information based on a determination performed at the UE. Thus, the UE decides when to send carrier selection data (e.g., channel quality information) and when to not send carrier selection data. In the example illustrated in FIG. 6, the UE operates in a proactive mode, that is, the UE determines to send carrier selection data based on not receiving a message, such as scheduled message.

Referring to timing diagram 600, a first cycle 612 is illustrated for two frequency ranges (e.g., FR1 and FR2), a first frequency range 622 (e.g., FR2) and a second frequency range 624 (e.g., FR1). Also, two component carriers (CCs) are illustrated for each frequency range 622, 624. Specifically, the first frequency range 622 has a first CC 632 (e.g., CC1) and a second CC 634 (e.g., CC2), and the second frequency range 624 has a third CC 636 (e.g., CC3) and a fourth CC 638 (e.g., CC4).

The base station 602 transmits a PDSCH 642 (e.g., first PDSCH) via the first CC 632. The PDSCH 642 may be signaled by the base station 602 by a corresponding PDCCH (not shown, such as PDCCH 546) via first CC 632. In the example of FIG. 6, the UE 604 is able to successfully receive and/or decode the PDSCH 642. In response to a PDSCH, such as PDSCH 642, UE 604 may transmit an acknowledgment message. In the example of FIG. 6, in response to successfully decoding PDSCH 642, the UE 604 transmits a positive acknowledgment message (ACK) in PUCCH 644 (e.g., first PUCCH). The ACK may be included in an uplink control message, such as a UCI.

Additionally, UE 604 determines whether or not to send carrier selection data (e.g., 354) to the base station 602, i.e., whether or not to generate and/or include the carrier selection data in PUCCH 644, such as a UCI thereof. For example, the UE 604 determines to whether to include carrier selection data in the PUCCH 644 based on comparing measurement data to a threshold. For example, the UE 604 may determine to include (or not include) carrier selection data in the PUCCH 644 based on the result of one or more comparisons. To illustrate, UE 604 may determine to include (or not include) carrier selection data in the PUCCH 644 based on the measurement data meeting or exceeding a corresponding threshold. As another illustration, the UE 604 may compare multiple measurements to multiple corresponding thresholds. As yet another illustration, the UE 604 may average multiple measurements together, such as multiple measurements take over multiple cycles, and compare the average measurement to a corresponding thresholds.

One or more of the thresholds may be set and/or adjusted by the UE, the base station, or both. For example, the UE may set the thresholds upon joining a network based on a configuration message from the base station. As another example, the UE may adjust the thresholds based on a configuration message (e.g., RRC) during operation. Additionally, or alternatively, the UE may set or adjust its own thresholds based on second thresholds. To illustrate, when a particular measurement value is above (or below) a second threshold which is higher (or lower) than a corresponding first thresholds, the UE may adjust the first threshold by increasing (or decreasing). Furthermore, two thresholds (e.g., high and low) may be used for a single type of comparison to implement hysteresis and reduce switching back and forth.

Responsive to receiving the ACK, the base station 602 determines to not initiate retransmission of the PDSCH 642. In some implementations, the UE 604 may not (e.g., may cease) including carrier selection data in the PUCCH 650. To illustrate, the UE 604 ceases to include carrier selection data in subsequent PUCCHs after successful retransmission. In other implementations, the 604 may include carrier selection data in the PUCCH 650. For example, the UE 604 may continue to include carrier selection data in subsequent PUCCHs after successful retransmission for X amount of cycles. The amount of cycles may be preprogramed or reconfigurable. As illustrative, non-limiting examples, 2, 3, 4, 5, 6, 7, 10, etc., cycles may be used for X.

Thus, FIG. 6 describes proactive carrier selection data. While proactive inclusion of carrier selection has increased overhead as compared to reactive carrier selection data in FIG. 5, proactive carrier selection data reduces retransmission and increases reliability and throughput. As compared to base station initiated carrier selection with UE input as in FIG. 4, the proactive carrier selection has reduced overhead and latency and increased throughput and reliability.

Referring to FIG. 7, FIG. 7 illustrates a timing diagram 700 illustrating communications between a base station 702 and a UE 704. Base station 702 may direct the UE 704 to operate in a UE aided carrier selection mode, such as provide channel quality information based on a determination performed at the UE. Thus, the UE decides when to transmit carrier selection data (e.g., channel quality information) and when to not transmit carrier selection data. In the example illustrated in FIG. 7, the UE operates in a hybrid mode, that is, the UE determines to send carrier selection data proactively and/or reactively.

Referring to timing diagram 700, two cycles, a first cycle 712 and as second cycle 714, are illustrated for two frequency ranges (e.g., FR1 and FR2), a first frequency range 722 (e.g., FR2) and a second frequency range 724 (e.g., FR1). Also, two component carriers (CCs) are illustrated for each frequency range 722, 724. Specifically, the first frequency range 722 has a first CC 732 (e.g., CC1) and a second CC 734 (e.g., CC2), and the second frequency range 724 has a third CC 736 (e.g., CC3) and a fourth CC 738 (e.g., CC4).

The base station 702 transmits a PDSCH 742 (e.g., first PDSCH) via the first CC 732. The PDSCH 742 may be signaled by the base station 702 by a corresponding PDCCH (not shown, such as PDCCH 746) via first CC 732. In the example of FIG. 7, the UE 704 is not able to successfully receive and/or decode the PDSCH 742. For example, there may be signal blockage on first CC 732. In response to a PDSCH, such as PDSCH 742, UE 704 may transmit an acknowledgment message. In the example of FIG. 7, in response to not decoding PDSCH 742, the UE 704 transmits a negative acknowledgment message (NACK) in PUCCH 744 (e.g., first PUCCH). The NACK may be included in an uplink control message, such as Uplink Control Information (UCI).

Additionally, UE 704 determines whether or not to send carrier selection data (e.g., 354) to the base station 702, i.e., whether or not to generate and/or include the carrier selection data in PUCCH 744, such as a UCI thereof. For example, the UE 704 determines to include carrier selection data in the PUCCH 744 based on not successfully decoding the PDSCH 742. In other examples, the UE 704 may determine to not include carrier selection data in the PUCCH 744 based on successfully decoding another PDSCH.

Responsive to receiving the NACK, the base station 702 determines to initiate retransmission of the PDSCH 742. Base station 702 determines to retransmit a PDSCH 748 (e.g., second PDSCH or PDSCH retransmission) based on the carrier selection data. For example, base station 702 determines to retransmit the PDSCH 748 via the third CC 738 in the second frequency range 724. The base station 702 signals the PDSCH 748 to the UE 704 by transmitting a PDCCH 746. IN FIG. 7, the PDCCH 746 is transmitted via the third CC 738. In the example in FIG. 7, the UE 704 successfully decodes the PDSCH 748 and transmits a second acknowledgment message in response via PUCCH 750 (e.g., second PUCCH). As illustrated in FIG. 7, in response to decoding PDSCH 748, the UE 704 sends a positive acknowledgment message (ACK) in PUCCH 750. The ACK may be included in an uplink control message, such as a UCI. In some implementations, the UE 704 may not (e.g., may cease) including carrier selection data in the PUCCH 750. To illustrate, the UE 704 ceases to include carrier selection data in subsequent PUCCHs after successful retransmission. In other implementations, the 704 may include carrier selection data in the PUCCH 750. For example, the UE 704 may continue to include carrier selection data in subsequent PUCCHs after successful retransmission for X amount of cycles. The amount of cycles may be preprogramed or reconfigurable. As illustrative, non-limiting examples, 2, 3, 4, 5, 6, 7, 10, etc., cycles may be used for X. Responsive to receiving the ACK, the base station 702 determines to not repeat retransmission of the PDSCH 542 (or not initiate retransmission of PDSCH 548).

In a second cycle 714, the base station 702 transmits a PDSCH 752 (e.g., third PDSCH) via the first CC 732. The PDSCH 752 may be signaled by the base station 702 by a corresponding PDCCH (not shown, such as PDCCH 546) via first CC 732. In the example of FIG. 7, the UE 704 is able to successfully receive and/or decode the PDSCH 752. In response to a PDSCH, such as PDSCH 752, UE 704 may transmit an acknowledgment message. In the example of FIG. 7, in response to successfully decoding PDSCH 752, the UE 704 transmits a positive acknowledgment message (ACK) in PUCCH 754 (e.g., third PUCCH). The ACK may be included in an uplink control message, such as a UCI.

Additionally, UE 704 determines whether or not to transmit carrier selection data (e.g., 354) to the base station 702, i.e., whether or not to generate and/or include the carrier selection data in PUCCH 754, such as a UCI thereof. The UE 704 may determine whether or not to include carrier selection data as described above with reference to FIG. 5 or 6.

Thus, FIG. 7 describes a hybrid mode where the UE can determine whether to include carrier selection data in an uplink message to the base station reactively, as in FIG. 5, and proactively, as in FIG. 6. Accordingly, the UE and the network can obtain the benefits of both modes, that is reduced latency overhead and increased throughput and reliability.

Additionally, in any of the UE aided carrier selection examples of FIGS. 5-7, the UE can still operate in a base station directed mode, as in FIG. 4. For example, the UE can still send carrier selection data (e.g., channel quality information) responsive to a UE channel report request by a base station. As another example, the UE can always send carrier selection data (e.g., channel quality information) responsive to a signal message from a base station to always provide quality information. Accordingly, the carrier selection operations described herein offer more flexibility with reduced overhead and enable UE aided carrier selection such that carrier selection with UE input can be enabled for short cycle durations, such as in 5G and/or URLLC modes.

Figure 10:
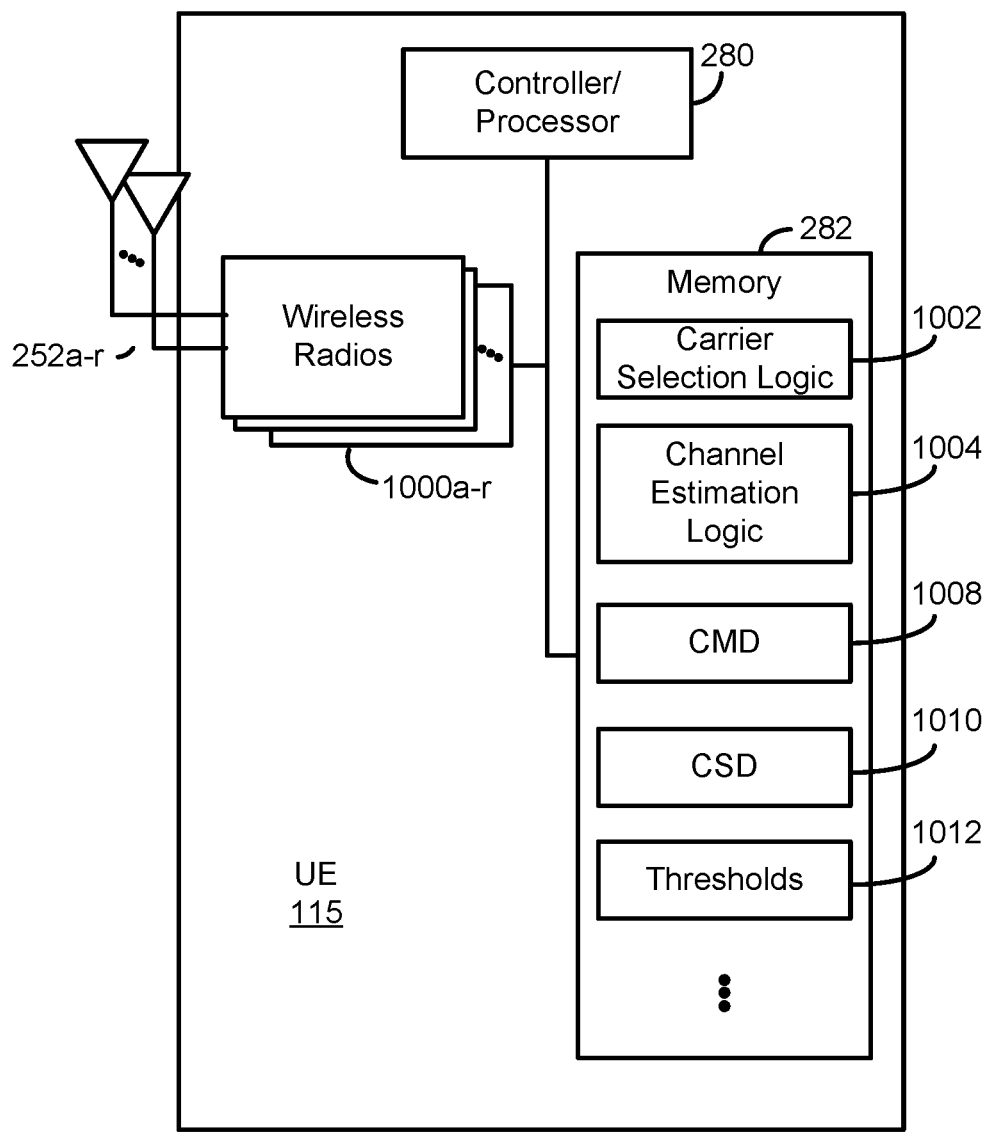
FIG. 10 is a block diagram conceptually illustrating a design of a UE according to some embodiments of the present disclosure.

FIG. 8 is a block diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 800, a UE monitors a first component carrier (CC) of a plurality of CCs for a first channel. A UE, such as UE 115, may execute, under control of controller/processor 280, carrier selection logic 1002, stored in memory 282. The execution environment of carrier selection logic 1002 provides the functionality for UE 115 to define and perform the carrier selection procedures. The execution environment of carrier selection logic 1002 defines the different carrier selection processes, such as determining whether to include carrier selection data in an uplink transmission and independent of signaling from the base station (e.g., gNB). UE 115 monitors for a downlink message via antennas 252*a-r* and wireless radios 1000*a-r*.

At block 801, the UE determines, during monitoring, one or more channel measurements for a set of candidate CCs of the plurality of CCs. The execution environment of carrier selection logic 1002 provides UE 115 the functionalities described with respect to the various aspects of the present disclosure. UE 115 may perform one or more channel measurement using wireless circuitry and/or channel measurement circuitry. Within the execution environment of carrier selection logic 1002, UE 115, under control of controller/processor 280, determines one or more channel measurements described above based on the energy received during monitoring. The UE 115 may monitor the channel used for the downlink transmission, other channels for a possible future retransmission, or a combination thereof.

At block 802, the UE determines, based on a determination at the UE, whether to include carrier selection data in an uplink transmission, the carrier selection data based on one or more channel measurements. UE 115 may perform one or more determinations described above, such as in FIGS. 3 and 5-7, to determine whether or not to includes carrier selection data in an uplink message.

At block 803, the UE transmits the carrier selection data in the uplink transmission. Once UE 115 determines to include the carrier selection data at block 802, UE 115 may transmit the carrier selection data (e.g., 352) in the uplink transmission for UE aided carrier selection via wireless radios 1000*a-r* and antennas 252*a-r*. Accordingly, the UE can assist the base station in determining when to include carrier selection data to reduce overhead and improve latency.

The UE 115 may execute additional blocks (or the UE 115 may be configured further perform additional operations) in other implementations. For example, the UE 115 may perform one or more operations described above. As another example, the UE 115 may perform and/or operate according to one or more aspects as described below.

In a first aspect, the first channel includes a Physical Downlink Shared Channel (PDSCH), a Physical Downlink Control Channel (PDCCH), or both.

In a second aspect, alone or in combination with one or more of the above aspects, the uplink transmission includes an acknowledgement for a Physical Downlink Shared Channel (PDSCH).

In a third aspect, alone or in combination with one or more of the above aspects, the uplink transmission includes a Physical Uplink Shared Channel (PUSCH), a Physical Uplink Control Channel (PUCCH), or both.

In a fourth aspect, alone or in combination with one or more of the above aspects, the determination at the UE includes a determination that a reception failure for the first channel occurred, that the channel quality of the first CC is below a certain threshold, or both.

In a fifth aspect, alone or in combination with one or more of the above aspects, the UE 115 transmits a negative acknowledgment (NACK) or uses discontinuous transmission (DTX) in an uplink transmission, wherein the reception failure is indicated by the NACK or the DTX in the uplink transmission.

In a sixth aspect, alone or in combination with one or more of the above aspects, channel quality includes signal-to-noise-plus-interference ratio (SINR), reference signal received power (RSRP), or log likelihood ration (LLR).

In a seventh aspect, alone or in combination with one or more of the above aspects, the channel measurements include signal-to-noise-plus-interference ratio (SINR), reference signal received power (RSRP) per CC, or both.

In an eighth aspect, alone or in combination with one or more of the above aspects, the carrier selection data includes an indication of a preferred frequency range, a preferred frequency band, or both.

In a ninth aspect, alone or in combination with one or more of the above aspects, the carrier selection data includes an indication of one or more preferred CC indices.

In a tenth aspect, alone or in combination with one or more of the above aspects, the carrier selection data includes an indication of a preferred CC type, wherein the preferred CC types includes a downlink only CC, an uplink only CC, or both a downlink and uplink CC.

In an eleventh aspect, alone or in combination with one or more of the above aspects, the carrier selection data includes a request to suspend or resume scheduling on a particular CC, frequency band, or frequency range.

In a twelfth aspect, alone or in combination with one or more of the above aspects, the carrier selection data includes information on quality of a frequency range, a frequency band, a CC, or a combination thereof.

In a thirteenth aspect, alone or in combination with one or more of the above aspects, the carrier selection data is used by a network entity to determine the set of CCs for a next transmission for the UE.

In a fourteenth aspect, alone or in combination with one or more of the above aspects, the next transmission comprises a downlink transmission or an uplink transmission.

In a fifteenth aspect, alone or in combination with one or more of the above aspects, the set of candidate CCs include the first CC.

In another aspect of the disclosure, a method of wireless communication includes monitoring, by a user equipment (UE) during a first cycle, a first component carrier (CC) of a plurality of CCs for a first Physical Downlink Shared Channel (PDSCH), determining, by the UE during monitoring, one or more channel measurements of the first CC, determining, by the UE during the first cycle and based on the one or more channel measurements, whether to include carrier selection data in an acknowledgement message corresponding to the first PDSCH, and transmitting, by the UE during the first cycle, the acknowledgement message including the carrier selection data in a Physical Uplink Control Channel (PUCCH) via a second CC of the plurality of CCs.

In some such aspects, the UE receives, after transmitting the first acknowledgement message, a second PDSCH via a second CC of the plurality of CCs, where the first PDSCH and the second PDSCH have the same transport block (TB), the same code block group (CBG), or both.

In some such aspects, the carrier selection data includes CC quality data.

In some such aspects, the CC quality data includes RSRP, SINR, path loss, interference, noise level, decoding log likelihood ratio, estimated BLER of monitored CORESETs, power headroom, estimated RSRP, or a combination thereof.

In some such aspects, the carrier selection data includes UE preferences which it determined based on the one or more channel measurements.

In some such aspects, the UE preferences include a preferred frequency range, frequency band, CC for at least a next PDSCH.

In some such aspects, the carrier selection data includes an indication, and the indication is configured to direct a base station to use another CC for PDSCH transmission, to suspend PDSCH transmission on a current CC, to resume PDSCH transmission on a previous CC.

In some such aspects, the UE compares at least one channel measurement of the one or more channel measurements of the first CC to a threshold to determine the carrier selection data.

In some such aspects, the UE determines CC quality data based the one or more channel measurements of the first CC and one or more second channel measurements of the first CC, and compares the CC quality data to a threshold to determine the carrier selection data.

In some such aspects, the UE averages a plurality of channel measurements of the first CC including the channel measurement to generate an average channel measurement for the first CC, and compares the average channel measurement to a threshold.

In some such aspects, the UE, prior to transmitting acknowledgment message, determines a reception result corresponding to the first PDSCH, where: based on the reception result corresponding to successful decoding of the first PDSCH, the acknowledgement message includes an ACK; and based on the reception result corresponding to unsuccessful decoding of the first PDSCH, the acknowledgement message includes a NACK to indicate the first PDSCH was not successfully decoded.

In some such aspects, the UE, after transmitting the acknowledgment message, receives a second PDSCH, the second PDSCH transmitted based on the carrier selection data of the acknowledgment message, the second PDSCH corresponding to a retransmission of the first PDSCH.

In some such aspects, the UE, prior to transmitting the acknowledgment message, successfully decodes the first PDSCH, and the acknowledgement message includes an ACK to indicate the first PDSCH was successfully decoded.

In some such aspects, the UE, after transmitting the acknowledgment message, receives second PDSCH, the second PDSCH transmitted based on the carrier selection data of the acknowledgment message, the second PDSCH different from the first PDSCH.

In some such aspects, the first PDSCH is transmitted on a first frequency range, and the second PDSCH is received on a second frequency range different from the first frequency range.

In some such aspects, the UE operates in a first mode in the first cycle, and the UE, in a second cycle, operates in a second mode different from the first mode, and the first mode includes one of a proactive mode or a reactive mode and the second mode includes the other of the proactive mode or the reactive mode.

In some such aspects, the carrier selection data is of a first type, and the UE transmits second carrier selection data for a second cycle, the second carrier selection data of a second type different from the first type.

In some such aspects, the UE, prior to receiving the first PDSCH, transmits a message indicating that the UE is configured for UE assisted fast CC selection.

In some such aspects, the message indicates a UE assisted fast CC selection type.

In some such aspects, the UE, responsive to transmitting the message, receives configuration message indicating a UE assisted fast CC selection type.

Figure 11:
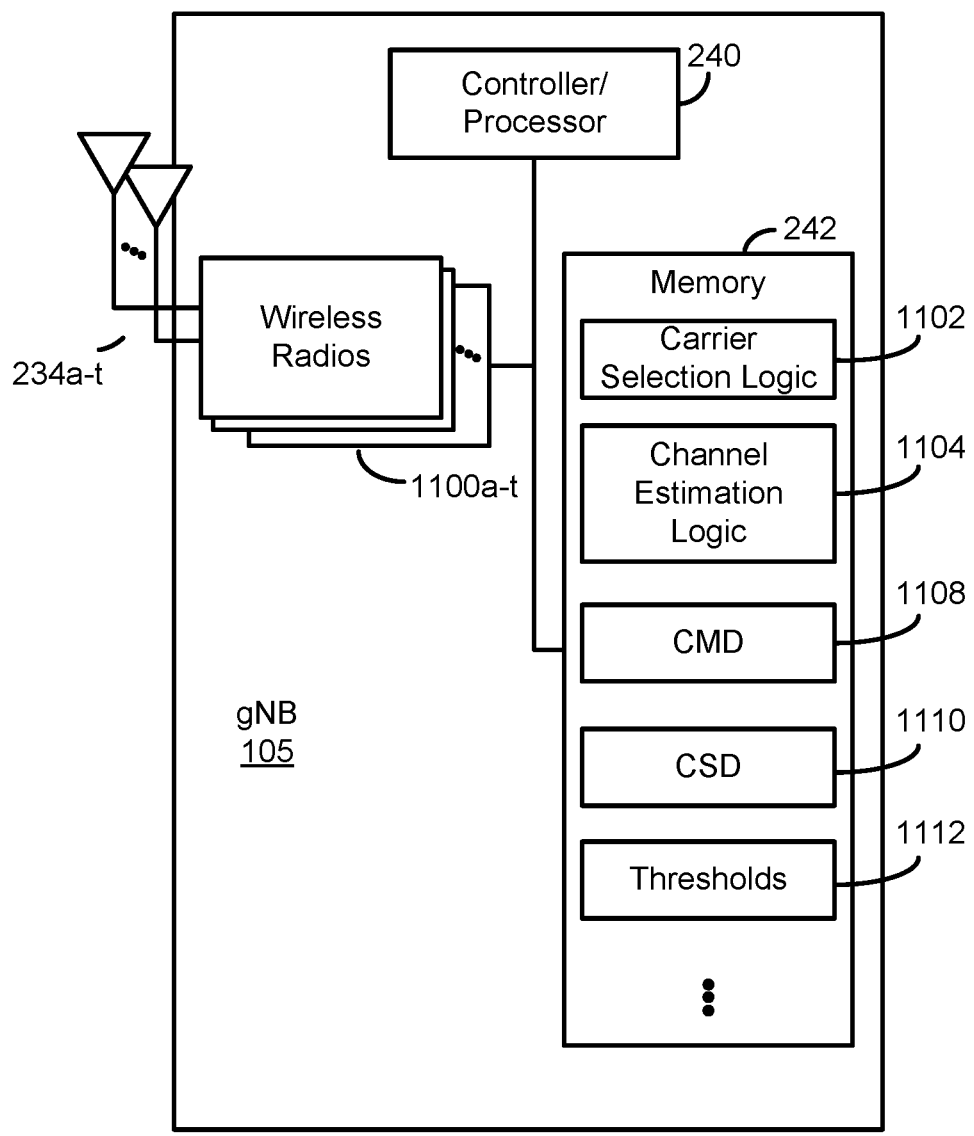
FIG. 11 is a block diagram conceptually illustrating a design of a base station configured according to some embodiments of the present disclosure.

FIG. 9 is a block diagram illustrating example blocks executed by a base station configured according to an aspect of the present disclosure. The example blocks will also be described with respect to gNB 105 (or eNB) as illustrated in FIG. 11. FIG. 11 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1100a-t and antennas 234a-r. Wireless radios 1100a-t includes various components and hardware, as illustrated in FIG. 2 for gNB 105, including modulator/demodulators 232a-t, MIMO detector 236, receive processor 238, transmit processor 220, and TX MIMO processor 230.

At block 900, a gNB transmits a first transmission via a first component carrier (CC) of a plurality of CCs for a first channel. A gNB, such as gNB 105, may execute, under control of controller/processor 240, carrier selection logic 1202, stored in memory 242. The execution environment of carrier selection logic 1102 provides the functionality for gNB 105 to define and perform the carrier selection procedures. The blocks 1102-1112 may include or correspond to blocks 1002-1012, respectively.

The execution environment of carrier selection logic 1102 defines the different carrier selection, generates control information related to the carrier selection, such as in selecting a physical channel for transmission. As gNB 105 generates and transmits the first transmission (e.g., a downlink message) via antennas 234a-t and wireless radios 1100a-t. Within the execution environment of the carrier selection logic 1102, gNB 105, under control of controller/processor 240, encodes the first transmission for transmission via a selected physical channel.

At block 901, the gNB receives, from a UE operating in a UE aided carrier selection mode, carrier selection data in an uplink transmission, the carrier selection data corresponding to the first transmission. The execution environment of the carrier selection logic 1102 provides gNB 105 the functionalities described with respect to the various aspects of the present disclosure. The gNB 105 may receive the uplink transmission, such as acknowledgement feedback (e.g., ACK or NACK) or a DTX (e.g., radio silence), for or corresponding the first transmission via wireless radios 1100a-t and antennas 234a-t. The carrier selection data was included in the uplink transmission based on a determination by the UE and independent of a UE report request and an always report mode. Accordingly, a gNB can transmit a retransmission based on the carrier selection data, such as in instances when the first transmission was not successfully received and decoded by the UE. To illustrate, the carrier selection data is used by the gNB to select a physical channel for retransmission. Therefore, latency and overhead can be reduced by using the UE to determine when to send the carrier selection data.

The base station 105 may execute additional blocks (or the base station 105 may be configured further perform additional operations) in other implementations. For example, the base station 105 may perform one or more operations described above. As another example, the UE 115 may perform and/or operate according to one or more aspects as described below.

In a first aspect, the first channel includes a Physical Downlink Shared Channel (PDSCH), a Physical Downlink Control Channel (PDCCH), or both.

In a second aspect, alone or in combination with one or more of the above aspects, the uplink transmission includes an acknowledgement for a Physical Downlink Shared Channel (PDSCH).

In a third aspect, alone or in combination with one or more of the above aspects, uplink transmission includes a Physical Uplink Shared Channel (PUSCH), a Physical Uplink Control Channel (PUCCH), or both.

In a fourth aspect, alone or in combination with one or more of the above aspects, when in a UE aided carrier selection mode, the UE determines one or more channel measurements for a set of candidate CCs of the plurality of CCs; the carrier selection data based on the one or more channel measurement, and the UE determines whether to include carrier selection data in the uplink transmission based on a UE determination.

In a fifth aspect, alone or in combination with one or more of the above aspects, the UE determination includes a reception failure for the first channel, the channel quality of the first CC is below a certain threshold, or both.

In a sixth aspect, alone or in combination with one or more of the above aspects, the base station 105 receives a negative acknowledgment (NACK) or a discontinuous transmission (DTX) in an uplink transmission, wherein the reception failure is indicated by the NACK or the DTX in the uplink transmission. Receiving a DTX may correspond to receiving no signal (e.g., message or data) during an uplink transmission window/opportunity.

In a seventh aspect, alone or in combination with one or more of the above aspects, the channel quality includes signal-to-noise-plus-interference ratio (SINR), reference signal received power (RSRP), or log likelihood ration (LLR).

In an eighth aspect, alone or in combination with one or more of the above aspects, the channel measurements include signal-to-noise-plus-interference ratio (SINR), reference signal received power (RSRP) per CC, or both.

In a ninth aspect, alone or in combination with one or more of the above aspects, the carrier selection data includes an indication of a preferred frequency range, a preferred frequency band, or both.

In a tenth aspect, alone or in combination with one or more of the above aspects, the carrier selection data includes an indication of one or more preferred CC indices.

In an eleventh aspect, alone or in combination with one or more of the above aspects, the carrier selection data includes an indication of a preferred CC type, wherein the preferred CC types includes a downlink only CC, an uplink only CC, or both a downlink and uplink CC.

In a thirteenth aspect, alone or in combination with one or more of the above aspects, the carrier selection data includes a request to suspend or resume scheduling on a particular CC, frequency band, or frequency range.

In a fourteenth aspect, alone or in combination with one or more of the above aspects, the carrier selection data includes information on quality of a frequency range, a frequency band, a CC, or a combination thereof.

In a fifteenth aspect, alone or in combination with one or more of the above aspects, the carrier selection data is used by the base station to determine a set of CCs for a next transmission for the UE.

In a sixteenth aspect, alone or in combination with one or more of the above aspects, the next transmission comprises a downlink transmission or an uplink transmission.

In a seventeenth aspect, alone or in combination with one or more of the above aspects, the set of candidate CCs includes the first CC.

In another aspect of the disclosure, a method of wireless communication includes transmitting, by a base station, a first Physical Downlink Shared Channel (PDSCH) via a first component carrier (CC) of a plurality of CCs, and receiving, by the base station from a UE operating in a UE aided carrier selection mode, an acknowledgement message (e.g., ACK or NACK of A/N) for the first PDSCH in a corresponding Physical Uplink Control Channel (PUCCH) of a second CC of the plurality of CCs, the acknowledgement message including carrier selection data for the first CC, the carrier selection data based on one or more channel measurements of the first CC by a user equipment (UE).

In some such aspects, the first PDSCH and the second PDSCH have the same TB, the same CBG, or both.

In some such aspects, the carrier selection data includes CC quality data.

In some such aspects, the CC quality data includes RSRP, SINR, path loss, interference, noise level, decoding log likelihood ratio, estimated BLER of monitored CORESETs, power headroom, estimated RSRP, or a combination thereof.

In some such aspects, the carrier selection data includes UE preferences which it determined based one or more channel measurements by the UE.

In some such aspects, the UE preferences include a preferred frequency range, frequency band, CC for at least a next PDSCH.

In some such aspects, the carrier selection data includes an indication, and the indication is configured to direct a base station to use another CC for PDSCH transmission, to suspend PDSCH transmission on a current CC, to resume PDSCH transmission on a previous CC.

In some such aspects, the carrier selection data includes instantons carrier selection criteria.

In some such aspects, the carrier selection data includes carrier selection criteria over a period of time.

In some such aspects, the carrier selection data includes averaged carrier selection criteria over a period of time.

In some such aspects, the acknowledgement message includes a NACK to indicate the first PDSCH was not successfully decoded.

In some such aspects, the base station, after receiving the NACK, transmits a second PDSCH, the second PDSCH transmitted based on the carrier selection data of the acknowledgment message, the second PDSCH corresponding to a retransmission of the first PDSCH.

In some such aspects, the acknowledgement message includes an ACK to indicate the first PDSCH was successfully decoded.

In some such aspects, the base station, after receiving the ACK, transmits a second PDSCH, the second PDSCH transmitted based on the carrier selection data of the acknowledgment message.

In some such aspects, the first PDSCH is transmitted on a first frequency range, and the second PDSCH is received on a second frequency range different from the first frequency range.

In some such aspects, the base station operates in a first mode in the first cycle, and the base station, in a second cycle, operates in a second mode different from the first mode, and the first mode includes one of a proactive mode or a reactive mode and the second mode includes the other of the proactive mode or the reactive mode.

In some such aspects, the carrier selection data is of a first type, and the base station further receives second carrier selection data for a second cycle, the second carrier selection data of a second type different from the first type.

In some such aspects, the base station, prior to receiving the first PDSCH, receives a message indicating that the UE is configured for UE assisted fast CC selection.

In some such aspects, the message indicates a UE assisted fast CC selection type.

In some such aspects, the base station, responsive to receiving the message, transmits a configuration message indicating a UE assisted fast CC selection type.

In another aspect of the disclosure, a method of wireless communication includes transmitting, by a base station operating in a user equipment (UE) assisted mode, a first Physical Downlink Shared Channel (PDSCH) via a first component carrier (CC) of a plurality of CCs; and receiving, by the base station from a UE, an acknowledgement message (e.g., ACK or NACK of A/N) for the first PDSCH in a corresponding Physical Uplink Control Channel (PUCCH) of a second CC of the plurality of CCs, the acknowledgement message including carrier selection data for the first CC, the carrier selection data a preferred frequency range, a preferred frequency band, a preferred CC, a request to suspend or request scheduling on a frequency range or band, or a quality indicator of a frequency range or band; and transmitting, by the base station to the UE, a next subsequent PDSCH via a second CC of the plurality of CCs selected based on the carrier selection data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
monitoring, by a user equipment (UE), a first component carrier (CC) of a plurality of CCs for a first channel;
determining, by the UE during monitoring, one or more channel measurements for a set of candidate CCs of the plurality of CCs;
determining, by the UE, whether to include carrier selection data in an uplink transmission, the carrier selection data based on one or more channel measurements; and
transmitting, by the UE, the carrier selection data in the uplink transmission, wherein the uplink transmission comprises an acknowledgement or a MAC-CE,
wherein the method further comprises:
monitoring, by the UE, a second CC of a second plurality of CCs for a second channel; and
receiving a downlink transmission via the second CC for the second channel,
wherein the second CC is included in a second frequency range different from a first frequency range of the first CC, and
wherein the downlink transmission is a retransmission of a failed transmission for the first channel, or the downlink transmission is received in a same subframe in which the UE monitored the first CC for the first channel.

2. The method of claim 1, wherein the uplink transmission comprises the acknowledgement and wherein the acknowledgement is for a Physical Downlink Shared Channel (PDSCH).

3. The method of claim 1, wherein determining whether to include carrier selection data in the uplink transmission is based on a determination that a reception failure for the first channel occurred, that a channel quality of the first CC is below a certain threshold, or both.

4. The method of claim 3, further comprising transmitting, by the UE, a negative acknowledgment (NACK) or using discontinuous transmission (DTX) in the uplink transmission, wherein the reception failure is indicated by the NACK or the use of DTX in the uplink transmission.

5. The method of claim 3, wherein the channel quality includes signal-to-noise-plus-interference ratio (SINR), reference signal received power (RSRP), or log likelihood ratio (LLR).

6. The method of claim 1, wherein the channel measurements include signal-to-noise-plus-interference ratio (SINR), reference signal received power (RSRP) per CC, or both.

7. The method of claim 1, wherein determining whether to include carrier selection data in the uplink transmission is based on a determination that a reception failure for the first channel occurred, and wherein the uplink transmission comprises the acknowledgement and indicates a negative acknowledgment (NACK).

8. The method of claim 1, wherein the acknowledgement or the MAC-CE indicates that a reception failure for the first channel occurred, and wherein the downlink transmission is a retransmission of the failed transmission for the first channel.

9. The method of claim 1, wherein the uplink transmission comprises the MAC-CE.

10. The method of claim 1, wherein the carrier selection data includes frequency range information for a second frequency range different from a first frequency range of the first CC.

11. The method of claim 1, wherein the downlink transmission is received in the same subframe in which the UE monitored the first CC for the first channel.

12. The method of claim 3, wherein determining whether to include carrier selection data in the uplink transmission is based on the determination that the reception failure for the first channel occurred.

13. The method of claim 3, wherein determining whether to include carrier selection data in the uplink transmission is based on the determination that the channel quality of the first CC is below the certain threshold.

14. The method of claim 4, the method comprising transmitting, by the UE, the negative acknowledgment (NACK), wherein the reception failure is indicated by the NACK.

15. The method of claim 4, further comprising transmitting, by the UE, using the discontinuous transmission (DTX) in the uplink transmission, wherein the reception failure is indicated by the use of DTX in the uplink transmission.

16. An apparatus configured for wireless communication, the apparatus comprising one or more memories and one or more processors coupled to the one or more memories, the one or more processors configured to:
monitor a first component carrier (CC) of a plurality of CCs for a first channel;
determine one or more channel measurements for a set of candidate CCs of the plurality of CCs;
determine whether to include carrier selection data in an uplink transmission, the carrier selection data based on one or more channel measurements; and
transmit the carrier selection data in the uplink transmission, wherein the uplink transmission comprises an acknowledgement or a MAC-CE,
wherein the one or more processors are further configured to:
monitor a second CC of a second plurality of CCs for a second channel; and
receive a downlink transmission via the second CC for the second channel,
wherein the second CC is included in a second frequency range different from a first frequency range of the first CC, and
wherein the downlink transmission is a retransmission of a failed transmission for the first channel, or the downlink transmission is received in a same subframe in which the UE monitored the first CC for the first channel.

17. The apparatus of claim 16, wherein the uplink transmission comprises the acknowledgement and wherein the acknowledgement is for a Physical Downlink Shared Channel (PDSCH).

18. The apparatus of claim 16, wherein to determine whether to include carrier selection data in the uplink transmission, the one or more processors are configured to determine whether to include carrier selection data in the uplink transmission based on a determination that a reception failure for the first channel occurred, that a channel quality of the first CC is below a certain threshold, or both.

19. The apparatus of claim 18, wherein the one or more processors are configured to transmit a negative acknowledgment (NACK) or using discontinuous transmission (DTX) in the uplink transmission, wherein the reception failure is indicated by the NACK or the use of DTX in the uplink transmission.

20. The apparatus of claim 18, wherein the channel quality includes signal-to-noise-plus-interference ratio (SINR), reference signal received power (RSRP), or log likelihood ratio (LLR).

21. The apparatus of claim 16, wherein the channel measurements include signal-to-noise-plus-interference ratio (SINR), reference signal received power (RSRP) per CC, or both.

22. The apparatus of claim 16, wherein to determine whether to include carrier selection data in the uplink transmission, the one or more processors are configured to determine whether to include carrier selection data in the uplink transmission based on a determination that a reception failure for the first channel occurred, and wherein the uplink transmission comprises the acknowledgement and indicates a negative acknowledgment (NACK).

23. The apparatus of claim 16, wherein the acknowledgement or the MAC-CE indicates that a reception failure for the first channel occurred, and wherein the downlink transmission is a retransmission of the failed transmission for the first channel.

24. The apparatus of claim 16, wherein the uplink transmission comprises the MAC-CE.

25. The apparatus of claim 16, wherein the carrier selection data includes frequency range information for a second frequency range different from a first frequency range of the first CC.

26. The apparatus of claim 16, wherein to receive the downlink transmission, the one or more processors are configured to receive the downlink transmission in the same subframe in which the UE monitored the first CC for the first channel.

27. The apparatus of claim 18, wherein to determine whether to include carrier selection data in the uplink transmission, the one or more processors are configured to determine whether to include carrier selection data in the uplink transmission based on the determination that the reception failure for the first channel occurred.

28. The apparatus of claim 18, wherein to determine whether to include carrier selection data in the uplink transmission, the one or more processors are configured to based on the determination that the channel quality of the first CC is below the certain threshold.

29. The apparatus of claim 19, wherein the one or more processors are configured to transmit the negative acknowledgment (NACK), wherein the reception failure is indicated by the NACK.

30. The apparatus of claim 19, wherein the one or more processors are configured to transmit using the discontinuous transmission (DTX) in the uplink transmission, wherein the reception failure is indicated by the use of DTX in the uplink transmission.

* * * * *